(No Model.)

H. C. BUELL.
CHECK HOOK FOR HARNESS.

No. 252,073. Patented Jan. 10, 1882.

WITNESSES:
C. Bendixon
Wm. C. Raymond

INVENTOR:
Henry C. Buell
per Duell, Laass & Huy
his attorneys

UNITED STATES PATENT OFFICE.

HENRY C. BUELL, OF ROME, NEW YORK.

CHECK-HOOK FOR HARNESS.

SPECIFICATION forming part of Letters Patent No. 252,073, dated January 10, 1882.

Application filed June 13, 1881. (No model.)

*To all whom it may concern:*

Be it known that, HENRY C. BUELL, of Rome, in the county of Oneida, in the State of New York, have invented new and useful Improvements in Harness Check-Hooks, of which the following, taken in connection with the accompanying drawings, is a full, clear, and exact description.

The nature of this invention consists chiefly in the combination, with a check-hook, of a spur or supplementary hook projecting from the base of the check-hook and terminating in the vicinity of the free end of same, whereby a simple and effective guard is obtained for preventing accidental unhooking of the check-rein, and said guard is also made to serve as a means for attaching the check-hook to the harness-saddle.

The invention also consists in a novel mode of applying the aforesaid check-hook to a harness-saddle, all as hereinafter more fully described.

Figure 1:
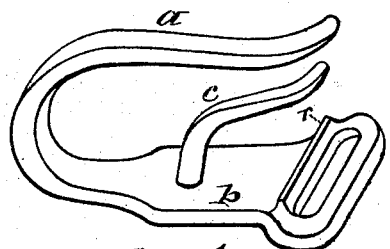
Figure 2:
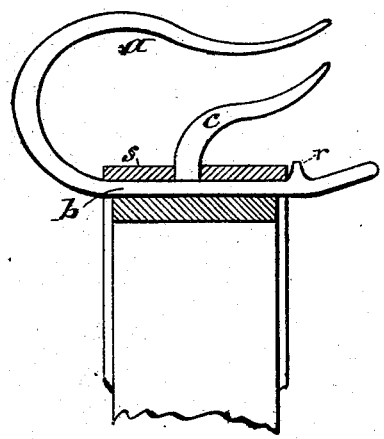

In the accompanying drawings, Figure 1 is a perspective view of my improved harness check-hook detached; and Fig. 2 is a sectional view of a harness-saddle, illustrating the attachment of the aforesaid check-hook.

Similar letters of reference indicate corresponding parts.

$a$ denotes the check-rein hook, of the ordinary form, and projecting from a base, $b$, by which it is secured to the harness-saddle.

$c$ is a rearwardly-disposed spur or supplementary hook projecting from the top of the base $b$, back of the check-hook, and terminating in the vicinity of the free end of the check-hook leaving merely sufficient space between the extremities of the two hooks to allow the check-rein to pass through edgewise only, and that chiefly by springing the check-hook upward or forward, thus effectually preventing accidental unhooking of the check-rein. The supplementary hook $c$, I prefer to cast with the check-hook in one piece, thereby rendering the device more stable and reducing the cost of manufacture.

The described check-rein hook is attached to the harness-saddle by perforating the strap $s$, usually extended over the top of the saddle, and inserting the supplementary hook $c$ through said perforation, and bringing said strap to bear on the base $b$ of the check-hook. A shoulder, $r$, extending across the top of the base $b$ and bearing against the rear edge of the aforesaid strap, prevents the check-hook from turning.

Having described my invention, what I claim as new, and desire to secure by Letters Patent, is—

1. A harness check-hook consisting of the main hook $a$, base $b$, and auxiliary hook $c$, rising centrally from said base, its end extending backward and terminating nearly on a line with the main hook $a$, and provided with the shoulder $r$, all substantially as specified and described.

2. A harness check-hook consisting of the main hook $a$, base $b$, and auxiliary hook $c$, rising centrally from said base, its end extending backward and terminating nearly on a line with the main hook $a$, adapted to receive and retain a strap, $s$, and provided with the shoulder $r$, substantially as specified and set forth.

In testimony whereof I have hereunto signed my name and affixed my seal, in the presence of two attesting witnesses, at Syracuse, in the county of Onondaga, in the State of New York, this 19th day of February, 1881.

HENRY C. BUELL. [L. S.]

Witnesses:
S. R. SMITH,
WM. C. RAYMOND.